United States Patent [19]
Zhang

[11] Patent Number: 6,067,215
[45] Date of Patent: May 23, 2000

[54] MAGNETIC SHIELDING FOR ELECTROMAGNETIC MICROACTUATOR

[75] Inventor: Lei Zhang, San Jose, Calif.

[73] Assignee: Seagate Technology, Inc., Scotts Valley, Calif.

[21] Appl. No.: 09/071,790

[22] Filed: May 1, 1998

Related U.S. Application Data

[60] Provisional application No. 60/061,649, Oct. 9, 1997.

[51] Int. Cl.[7] ................................................ G11B 5/55
[52] U.S. Cl. ................................... 360/260; 360/294.3
[58] Field of Search .................................. 360/104–109, 360/260, 244–294.6

[56] References Cited

U.S. PATENT DOCUMENTS

| | | | |
|---|---|---|---|
| 4,363,046 | 12/1982 | Saito | 360/106 |
| 4,605,977 | 8/1986 | Matthews | 360/103 |
| 4,620,251 | 10/1986 | Gitzendanner | 360/103 |
| 4,633,352 | 12/1986 | Mitzoguchi et al. | 360/104 |
| 4,651,242 | 3/1987 | Hirano et al. | 360/103 |
| 4,651,243 | 3/1987 | Daste et al. | 360/104 |
| 4,853,810 | 8/1989 | Pohl et al. | 360/103 |
| 4,935,830 | 6/1990 | Hiraoka et al. | 360/128 |
| 4,962,391 | 10/1990 | Kitahara et al. | 346/140 |
| 5,003,423 | 3/1991 | Imamura et al. | 360/125 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,072,240 | 12/1991 | Miyazawa et al. | 346/140 |
| 5,079,659 | 1/1992 | Hagen | 360/104 |
| 5,105,408 | 4/1992 | Lee et al. | 369/44.15 |
| 5,134,534 | 7/1992 | Sasaki | 360/126 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,280,402 | 1/1994 | Anderson et al. | 360/106 |
| 5,424,891 | 6/1995 | Oda et al. | 360/128 |
| 5,552,809 | 9/1996 | Hosono et al. | 347/10 |
| 5,617,279 | 4/1997 | Ohsaka | 360/128 |
| 5,657,188 | 8/1997 | Jurgenson et al. | 360/106 |
| 5,699,212 | 12/1997 | Erpelding et al. | 360/104 |
| 5,745,319 | 4/1998 | Takekado et al. | 360/78.05 |

OTHER PUBLICATIONS

"Silicon Micromachined electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System " by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using A Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

*Primary Examiner*—William Klimowicz
*Attorney, Agent, or Firm*—Kinney & Lange, P.A.

[57] ABSTRACT

A disc drive microactuation system finely positions a transducing head carried by a slider adjacent a selected radial track of a rotatable disc. An electromagnetic microactuator having a stator and a rotor operatively connected to the slider is provided on a substrate. The rotor is movable with respect to the stator to effect fine movement of the slider. A magnetic shield layer is provided on the substrate for shielding the electromagnetic microactuator.

1 Claim, 9 Drawing Sheets

MAGNETIC SHIELDING FOR ELECTROMAGNETIC MICROACTUATOR

CROSS-REFERENCE TO RELATED APPLICATION(S)

This application claims priority from Provisional Application Ser. No. 60/061,649 filed Oct. 9, 1997, entitled "Side Magnetic Shield Layer for Electromagnetic Micro Actuators" by L. Zhang.

Reference is hereby made to copending U.S. application Ser. No. 09/010,100 filed Jan. 21, 1998, for "Magnetic Microactuator and Inductive Sensor Having Shaped Pole Configuration" by L. Zhang, P. Ryan and P. Crane.

BACKGROUND OF THE INVENTION

The present invention relates to a disc drive microactuator system, and more particularly to a side shield layer for protecting a transducing head from fringe fields generated by the microactuator.

The density of concentric data tracks on magnetic discs continues to increase (that is, the radial spacing between data tracks is decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks. Various microactuator locations and designs have been considered to achieve high resolution head positioning. One promising design involves inserting a silicon-based thin-film structure between the suspension and the slider in the disc drive assembly. The microactuator includes, for example, an electromagnetic transducer having magnetic core materials having a stator and a rotor, with conductive coils wrapped around the stator core in a solenoid-type or planar-type configuration. One example of a high performance electromagnetic microactuator is disclosed in the aforementioned Zhang et al. application, which is hereby incorporated by reference.

It is important when implementing an electromagnetic microactuator to ensure that fringe fields from the microactuator do not degrade the performance of the transducing head carried by the disc drive slider over the rotating disc media. Magnetoresistive (MR) heads are sensitive to magnetic fields, and giant magnetoresistive (GMR) heads even more so. Magnetic fields generated by the electromagnetic microactuator can potentially have significant effects on the off-track capability (OTC) performance of MR and GMR heads. The present invention is directed to microactuator systems, such as that described in the Zhang et al. application, to prevent degradation of transducing head performance.

BRIEF SUMMARY OF THE INVENTION

The present invention is a disc drive microactuation system for finely positioning a transducing head carried by a slider adjacent a selected radial track of a rotatable disc. An electromagnetic microactuator has a stator and a rotor operatively connected to the slider. The rotor is movable with respect to the stator to effect fine movement of the slider. A magnetic shield layer is provided substantially around the periphery of the electromagnetic microactuator for shielding the transducing head from fields generated by the electromagnetic microactuator. In one aspect of the invention, the magnetic shield layer is embedded between the electromagnetic microactuator and the rotatable disc.

DETAILED DESCRIPTION OF THE PREFERRED EMBODIMENTS

Figure 1:
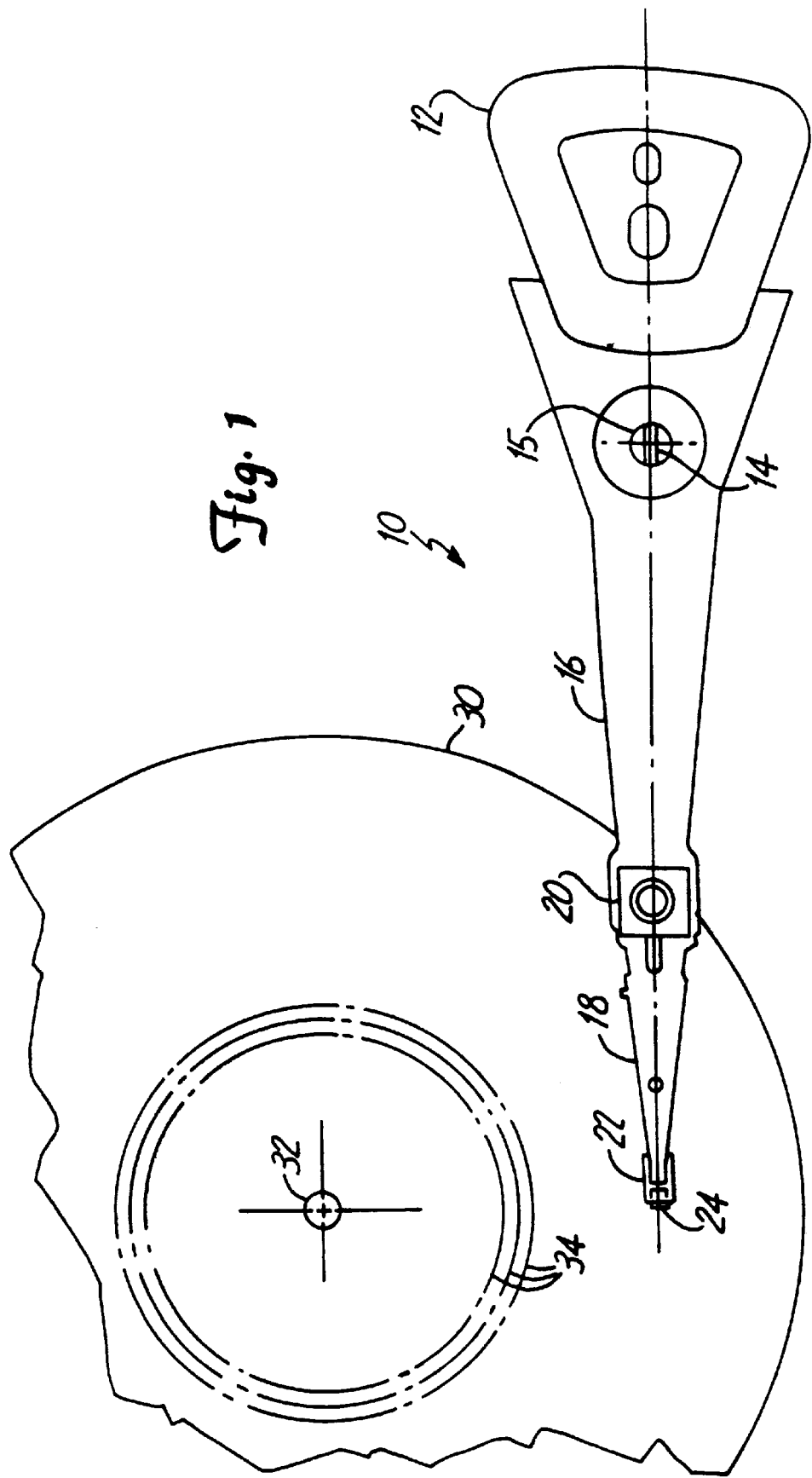
FIG. 1 is a plan view of a disc drive actuation system for positioning a slider over tracks of a disc.

FIG. 1 is a plan view of a disc drive actuation system 10 for positioning slider 24 over a selected track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to head suspension 18, and carries slider 24. Slider 24 carries a transducing head (not shown in FIG. 1) for reading and/or writing data on concentric tracks 34 of disc 30. Disc 30 rotates around axis 32, so that windage is encountered by slider 34 to keep it aloft a small distance above the surface of the disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 precisely over a selected track 34 of disc 30. Therefor, a higher resolution actuation device is necessary.

Figure 2:
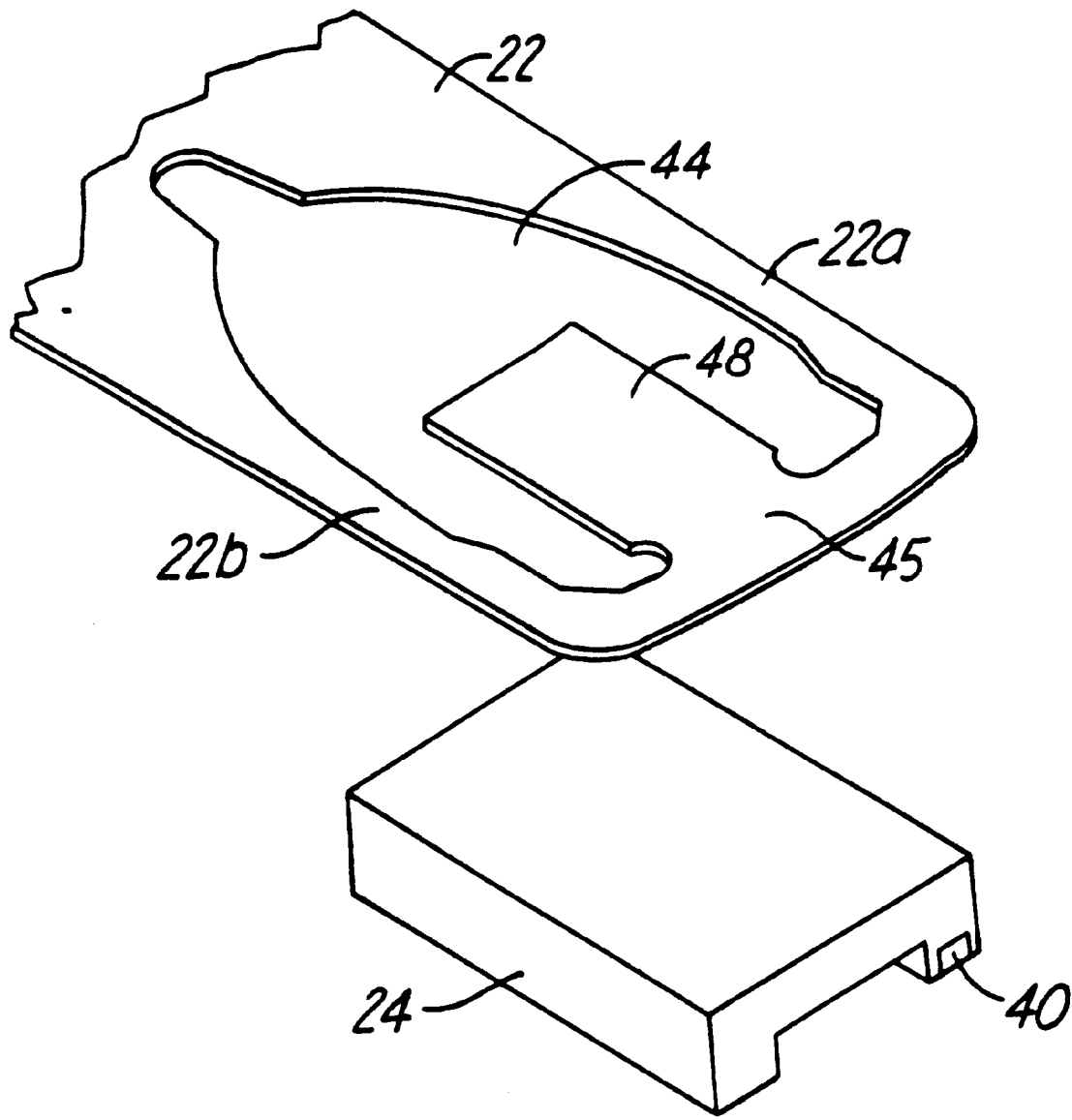
FIG. 2 is an exploded perspective view of a portion of the disc drive actuation system shown in FIG. 1, illustrating the relationship between the flexure and the slider.

FIG. 2 is an exploded perspective view of a portion of the disc drive actuation shown in FIG. 1, showing flexure 22 and slider 24 in more detail. Flexure 22 is mounted to the underside of a distal end of head suspension 18 (FIG. 1). Flexure 22 includes arms 22a and 22b forming aperture 44 therebetween to provide resilience and gimbaling spring to flexure 22. The distal end of arms 22a and 22b are connected by cross beam 45. Central tongue 48 extends from cross beam 45 into aperture 44 in a plane generally parallel to a plane defined by flexure arms 22a and 22b. The top surface of slider 24 is attached, such as by adhesive, to tongue spring 48. Transducing head 40 is carried at a trailing edge of slider 24.

Figure 3:
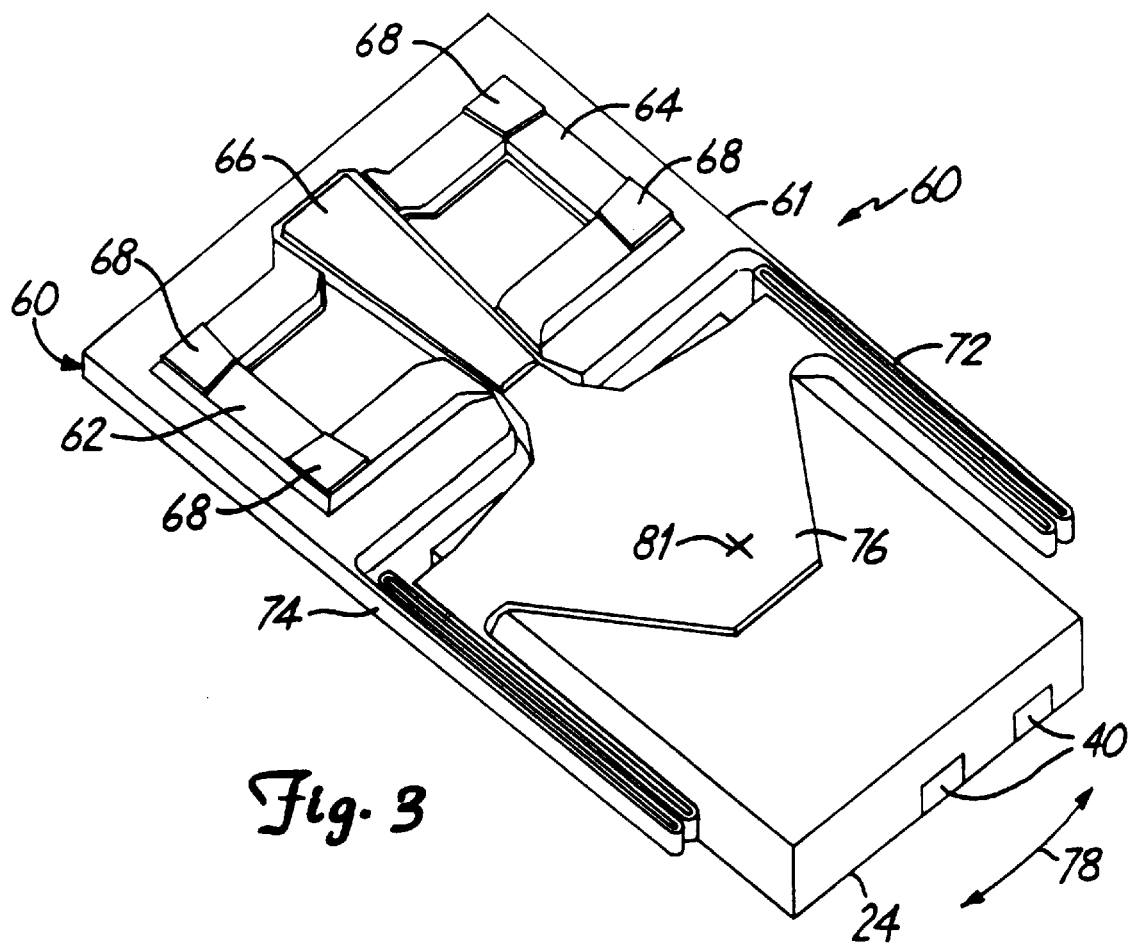
FIG. 3 is a perspective view of a microactuator configured between the flexure and the slider of a disc drive microactuation system.

FIG. 3 is a perspective view of microactuator 60 configured between flexure 22 and slider 24 in a disc drive microactuation system. Microactuator 60 includes first stator 62 and second stator 64 on substrate 61, with bond pads 68 providing access to contact first and second stators 62 and 64. Rotor 66 is formed on substrate 61 between first and second stators 62 and 64, and is movable with respect to the stators. Flexible arms 72 and 74 extend from the body of the stator portion of microactuator 60 and connect on opposite sides to central tongue 76, which is attached to a distal end of rotor 66 and is attached to slider 24 by an adhesive, for example. Pre-load force is applied through central tongue 76 to slider 74 at pre-load point 81. Therefore, operation of microactuator 60 translationally moves rotor 66 with respect to first and second stators 62 and 64, which in turn forces bending of arms 72 and 74 and alters the position of the central tongue 76, moving transducing head 40 with respect to flexure 22 in the direction of arrows 78 to radially position head 40 over a radial data track of a rotating disc below slider 24. A detailed description of the structure and operation of electromagnetic microactuator 60 is provided in the aforementioned Zhang et al. application.

Figure 4:
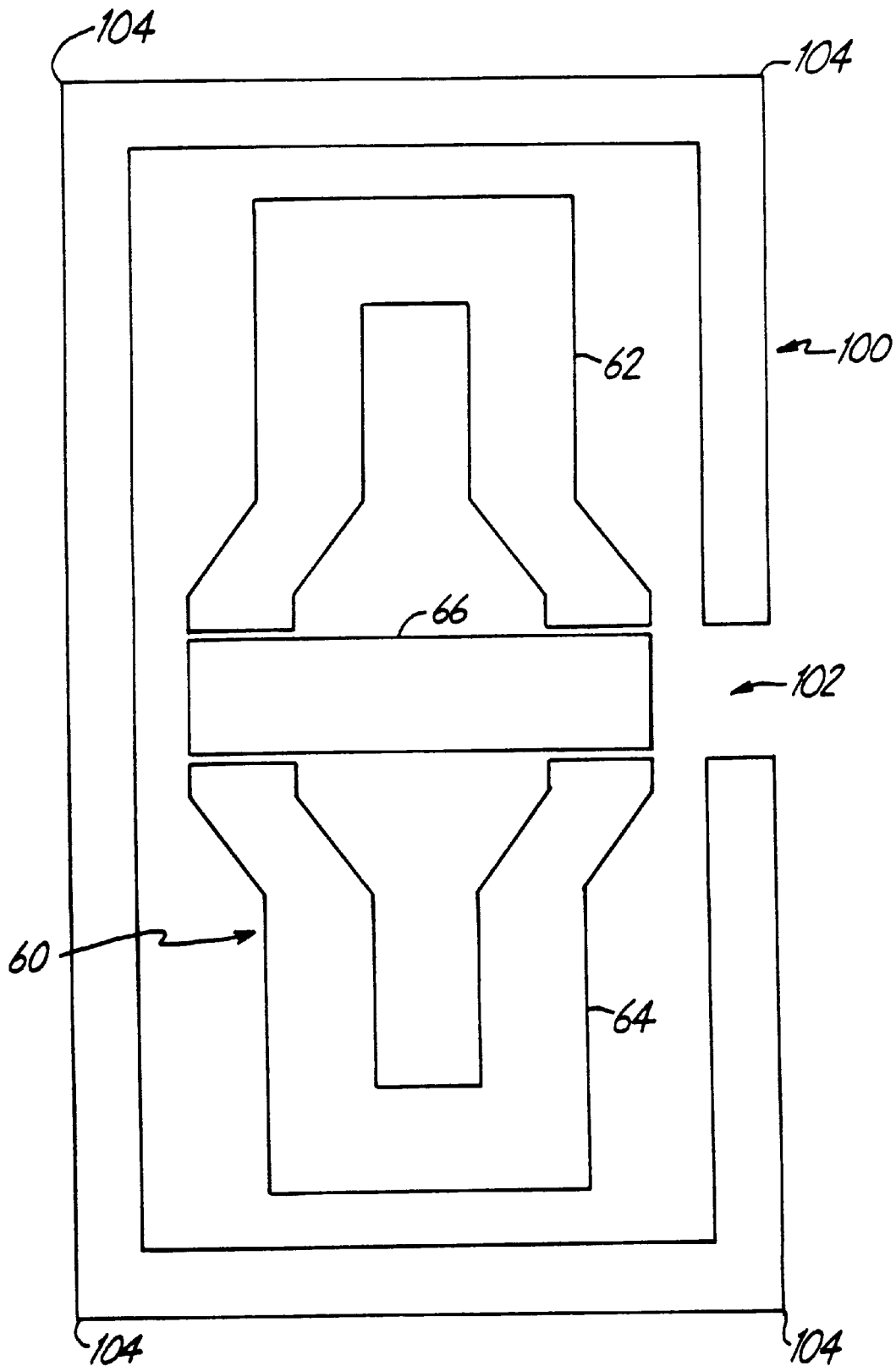
FIG. 4 is a plan view of a microactuator having a side magnetic shield according to a first embodiment of the present invention.

One problem with microactuator 60 is that it produces fringe fields that have potentially degrading effects on the performance of transducing head 40. FIGS. 4–8 illustrate shielding configurations to reduce the fringe fields at transducing head 40. FIG. 4 is a plan view of microactuator 60 having a side magnetic shield 100 according to a first embodiment of the present invention. Shield 100 is shaped to surround microactuator 60 except at aperture 102 where rotor 66 is connected to the slider (shown in FIG. 3), and has square corners 104 around its perimeter. Shield 100 is formed by conventional magnetic deposition methods such as electroplating and sputtering, preferably by electroplating during the same process in which microactuator 60 is formed. Shield 100 is preferably composed of a material with high magnetic permeability, such as permalloy, so that effective shielding is provided for the relatively low frequencies and field strengths associated with microactuator 60. If a microactuator using high frequencies and field strengths is implemented, a conductive shield composed of a conductive material such as copper is preferred.

Figure 5:
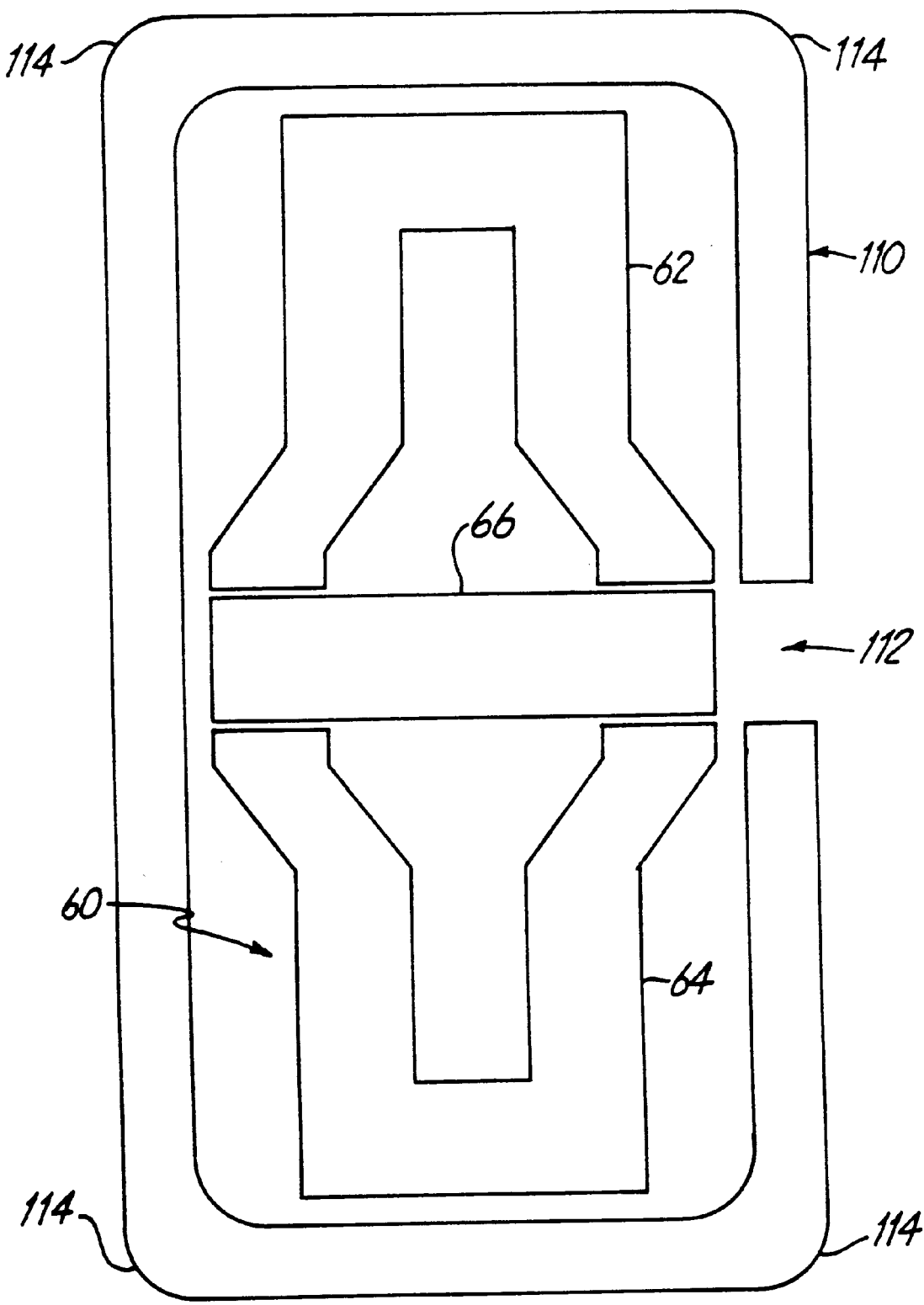
FIG. 5 is a plan view of a microactuator having a side magnetic shield according to a second embodiment of the present invention.

FIG. 5 is a plan view of microactuator 60 having a side magnetic shield 110 on substrate 61 according to a second embodiment of the present invention. Shield 110 is shaped to surround microactuator 60 except at aperture 112 where rotor 66 is connected to the slider (shown in FIG. 3), and has rounded corners 114 around its perimeter. Shield 110 is formed in substantially the same manner and of substantially the same materials as described above with respect to FIG. 4.

Figure 6:
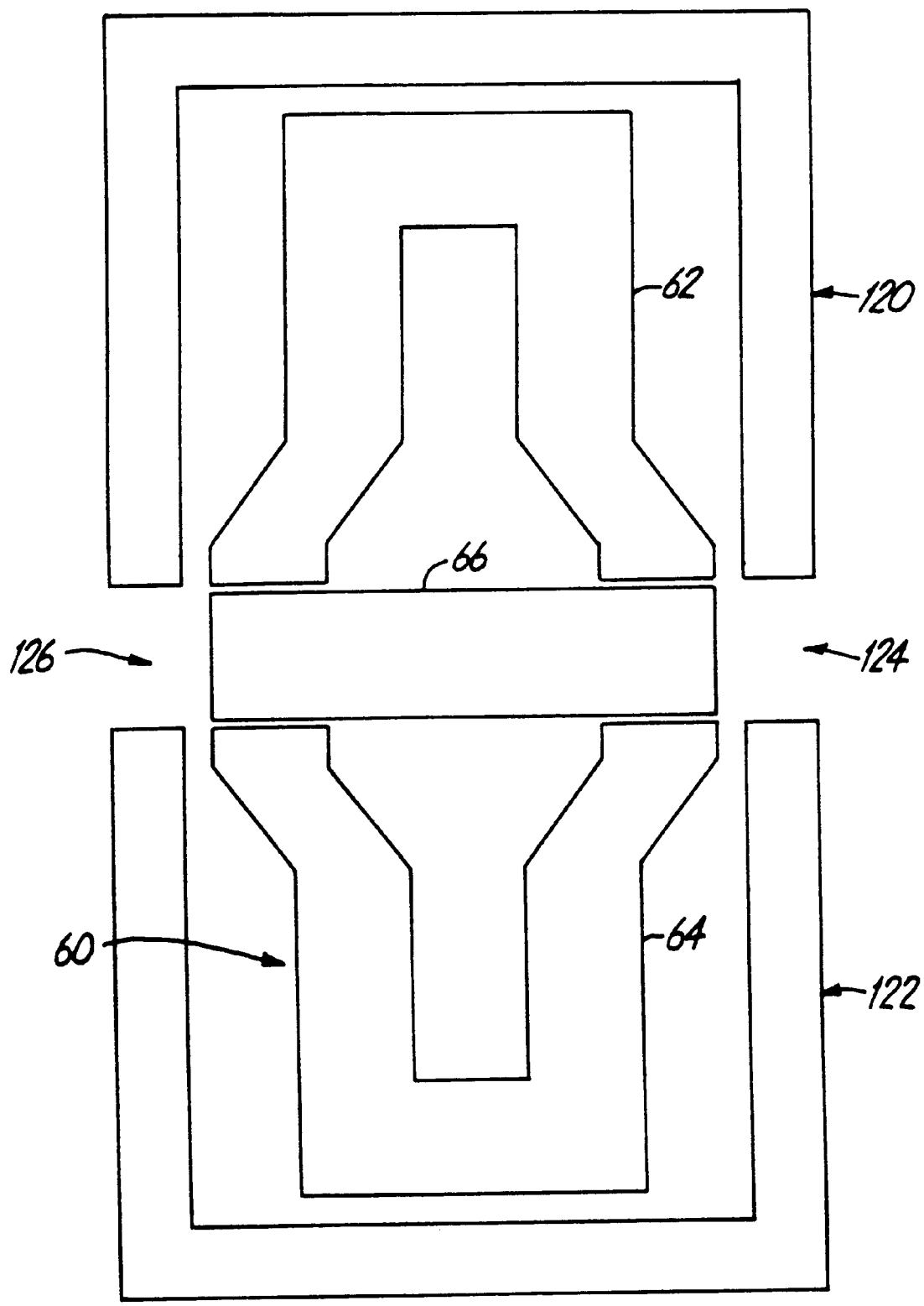
FIG. 6 is a plan view of a microactuator having a side magnetic shield according to a third embodiment of the present invention.

FIG. 6 is a plan view of microactuator 60 having side magnetic shields 120 and 122 on substrate 61 according to a third embodiment of the present invention. Shield 120 is shaped to substantially enclose stator 62, and shield 122 is shaped to substantially enclose stator 64, leaving aperture 124 where rotor 66 connects to the slider (shown in FIG. 3) and aperture 126 on the opposite side of rotor 66. Shields 120 and 122 are formed in substantially the same manner and of substantially the same materials as described above with respect to FIG. 4.

Figure 7:
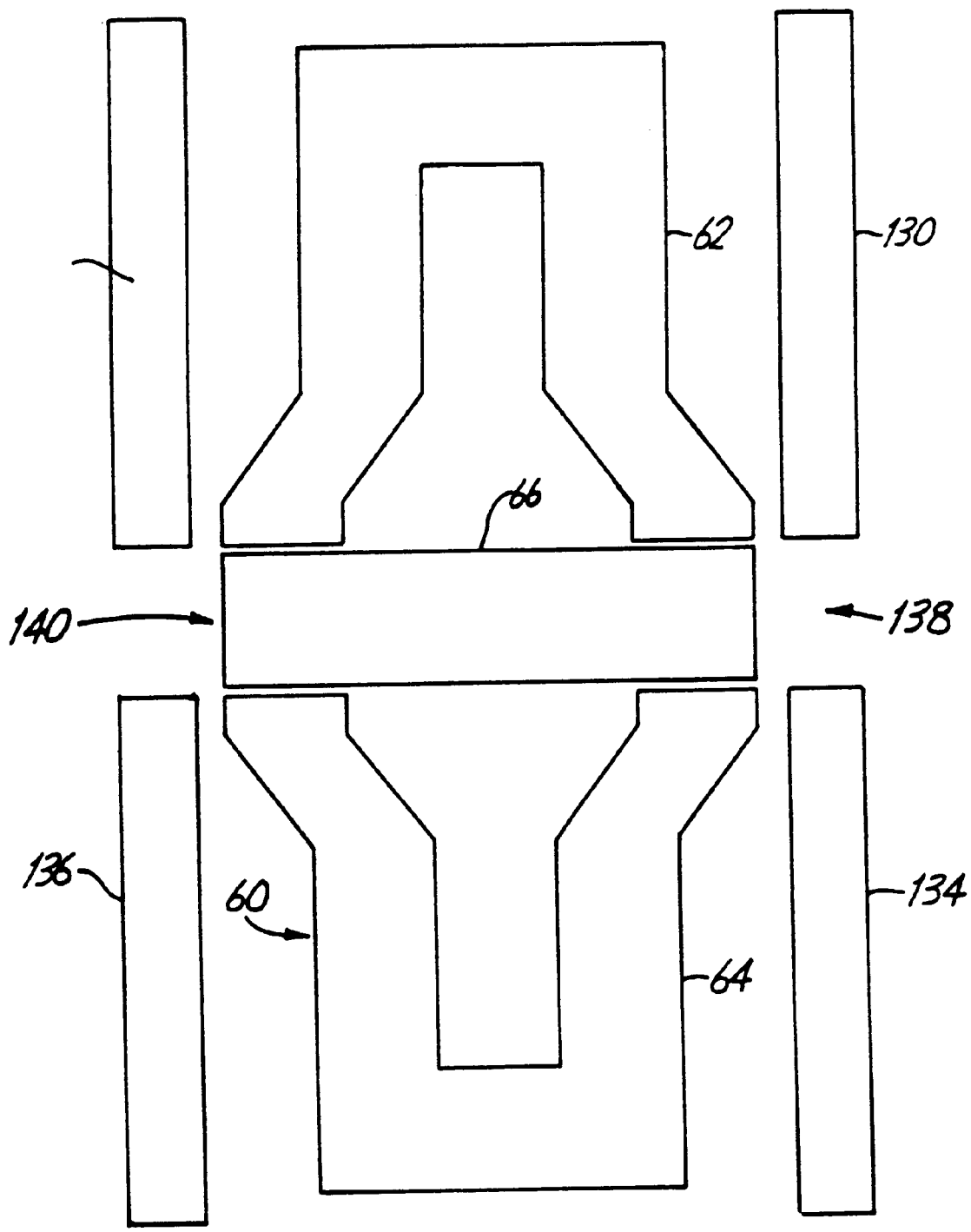
FIG. 7 is a plan view of a microactuator having a side magnetic shield according to a fourth embodiment of the present invention.

FIG. 7 is a plan view of microactuator 60 having side magnetic shields 130, 132, 134 and 136 on substrate 61 according to a fourth embodiment of the present invention. Shields 130 and 132 are located on opposite sides of stator 62, and shields 134 and 136 are located on opposite sides of stator 64, leaving aperture 138 between shields 130 and 134 where rotor 66 connects to the slider (shown in FIG. 3) and aperture 140 between shields 132 and 136 on the opposite side of rotor 66. Shields 130, 132, 134 and 136 are formed in substantially the same manner and of substantially the same materials as described above with respect to FIG. 4.

Figure 8:
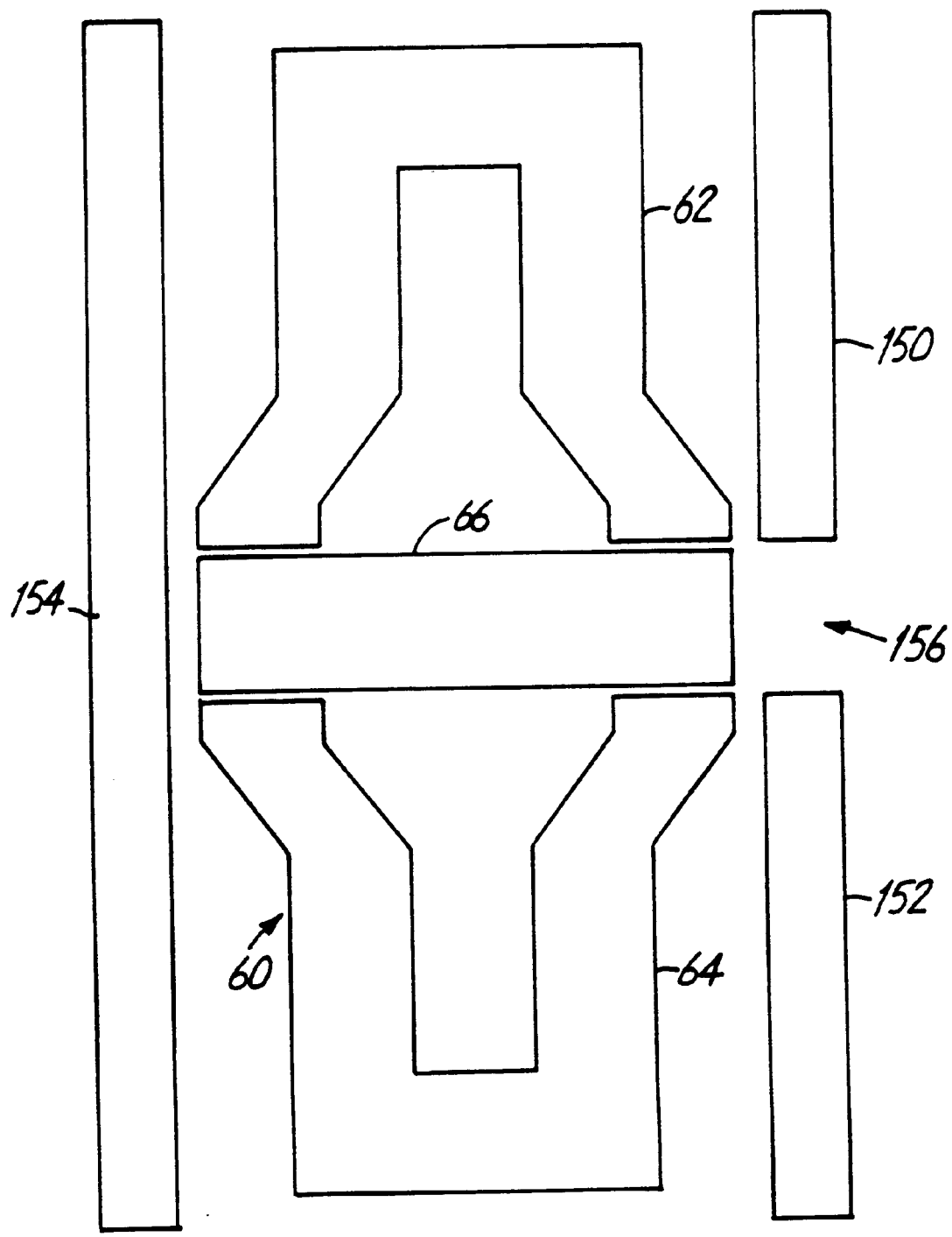
FIG. 8 is a plan view of a microactuator having a side magnetic shield according to a fifth embodiment of the present invention.

FIG. 8 is a plan view of microactuator 60 having side magnetic shields 150, 152 and 154 on substrate 61 according to a fifth embodiment of the present invention. Shields 150 and 152 are located on one side of stators 62 and 64, respectively, leaving aperture 156 between them where rotor 66 connects to the slider (shown in FIG. 3). Shield 154 extends adjacent both stators 62 and 64 on the side opposite shields 150 and 152. Shields 150, 152 and 154 are formed in substantially the same manner and of substantially the same materials as described above with respect to FIG. 4.

It will be apparent to one skilled in the art that numerous other variations and modifications of the shield configurations shown herein are possible, and are contemplated by the present invention. The arrangements shown in FIGS. 4–8 are exemplary to illustrate the concept introduced by the present invention. The shielding characteristics and processing steps involved vary with each embodiment shown in FIGS. 4–8, but all embodiments provide magnetic shielding of the microactuator in accordance with the principle of the present invention.

Figure 9:
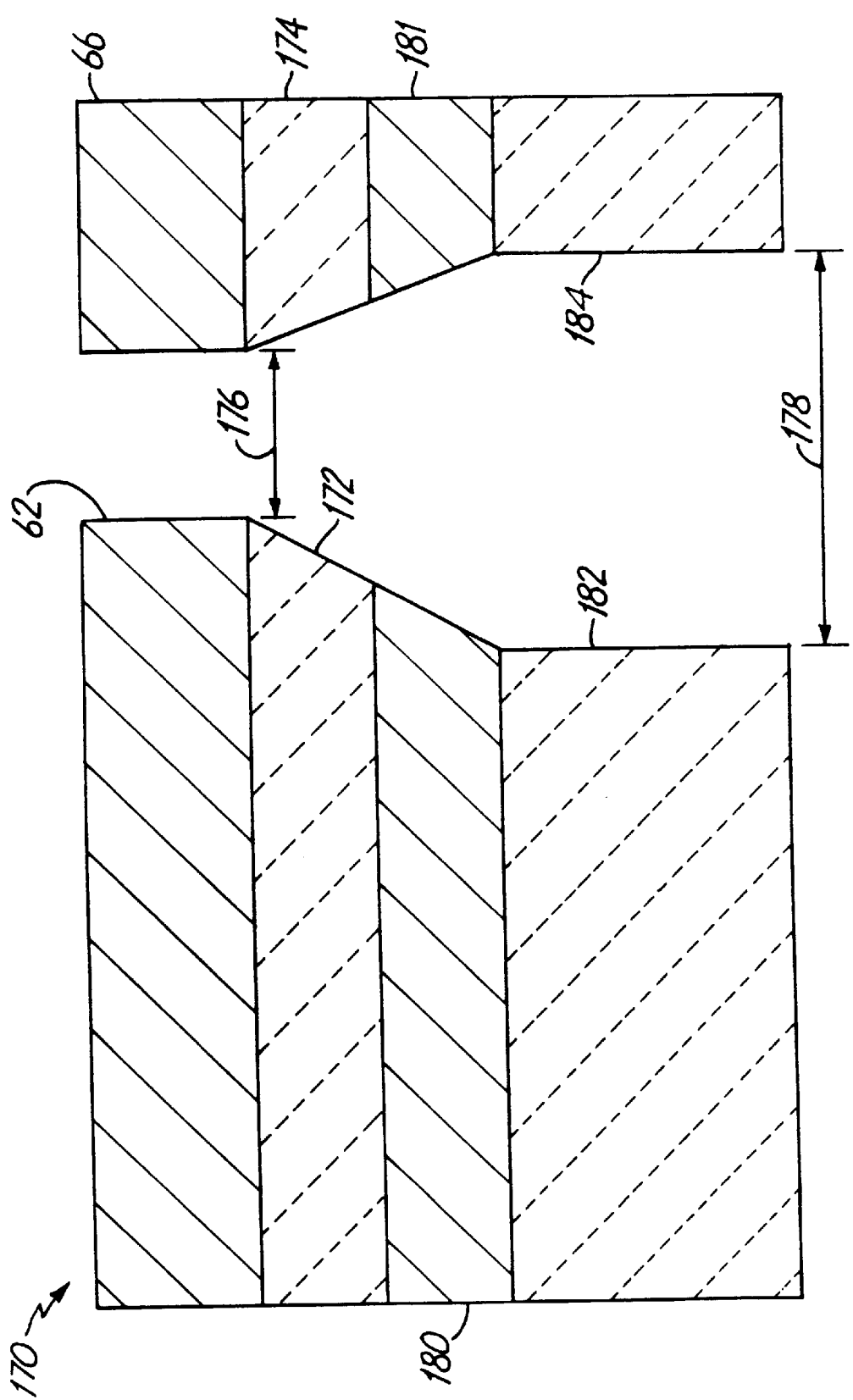
FIG. 9 is a section view of a microactuator having an embedded magnetic shield according to a sixth embodiment of the present invention.

FIG. 9 is a section view of a microactuator 170 having embedded magnetic shields 180 and 181 according to a sixth embodiment of the present invention, to reduce the fringe field at the disc media below the microactuator. Before stator 62 and rotor 66 are formed on substrate portions 182 and 184, respectively, shield layers 180 and 181 are formed on respective substrate portions 182 and 184. Spacer layers 172 is formed between stator 62 and shield 180, and spacer layer 174 is formed between rotor 66 and shield 181. The layers of microactuator 170 are formed so that gap 178 between opposing faces of shields 180 and 181 is greater than gap 176 between opposing faces of stator 62 and rotor 66. This design ensures that shield layers 180 and 181 act as magnetic shields in the vertical direction, rather than as a magnetic relay diverting flux flowing between stator 62 and rotor 66. Shield layers 180 and 181 may be composed of permalloy, for example, and may be formed by electroplating or an alternative deposition method known in the art.

The present invention therefore provides a system to shield a transducing head and/or a disc media from fringe fields created by an electromagnetic microactuator. There are many possible configurations of the shielding layers, with each design limiting the magnetic field strength at the transducing head to an acceptable level. For example, with a microactuator having an air gap between the stator and the rotor of 8 microns, 62 coils wrapped around the stator, a current of 20 milliamps flowing through the coils, and a transducing head located 1650 microns from the center of the stator, the shield layer configuration shown in FIG. 4 reduced the magnetic field strength at the transducing head from 0.30 Oersted (without shielding) to 0.05 Oersted (with shielding), approximately an 83% reduction in fringe field strength at the head. This example illustrates the substantial reductions in fringe field strengths and effects that may be achieved through use of side shielding according to the present invention.

Although the present invention has been described with reference to preferred embodiments, workers skilled in the art will recognize that changes may be made in form and detail without departing from the spirit and scope of the invention.

What is claimed is:

1. A disc drive microactuation system for finely positioning a transducing head carried by a slider adjacent a selected radial track of a rotatable disc, comprising:

an electromagnetic microactuator having a stator and a rotor operatively connected to the slider, the rotor being movable with respect to the stator to effect fine movement of the slider; and a magnetic shield layer between the electromagnetic microactuator and the rotatable disc, the magnetic shield layer having a first portion between the stator and the rotatable disc and a second portion between the rotor and the rotatable disc, wherein a gap between the first and second portions of the magnetic shield layer is larger than a gap between the stator and the rotor.

* * * * *